April 10, 1962     E. M. BORG     3,028,969
EXTRACTING MACHINE FOR USE IN FISH CANNING
Filed Dec. 11, 1959     3 Sheets-Sheet 1

INVENTOR.
EDWARD M. BORG
BY
Robinson Berry
ATTORNEYS

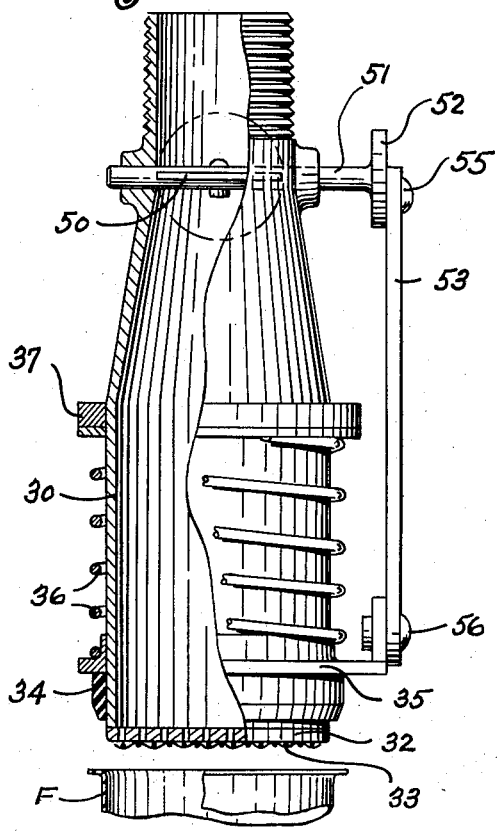
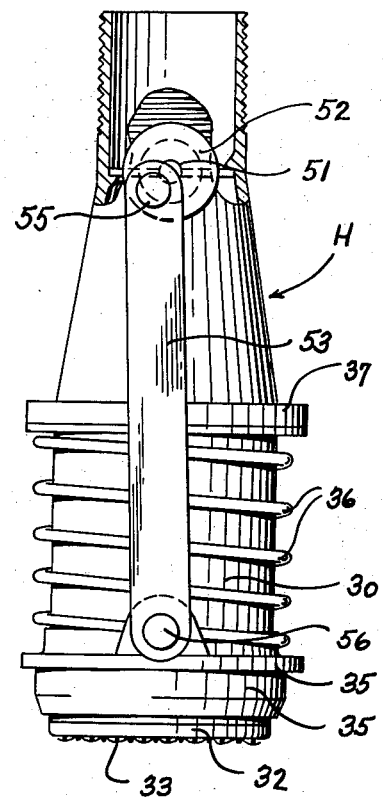
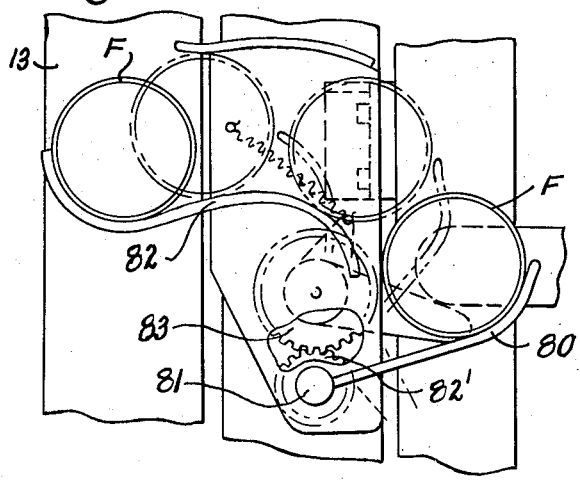

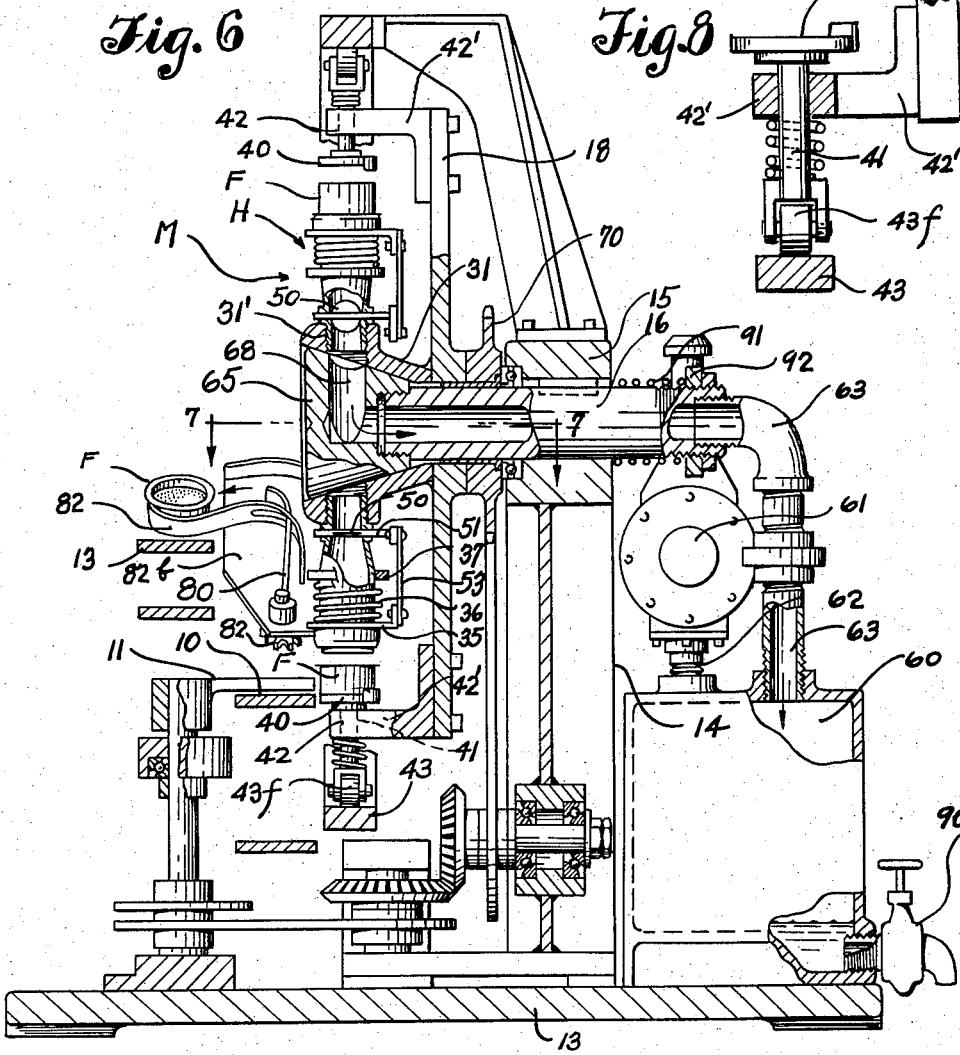
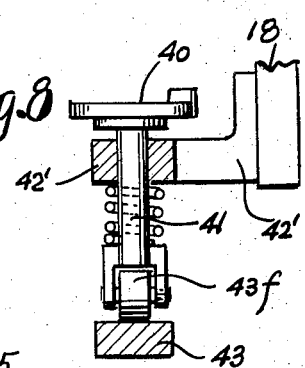
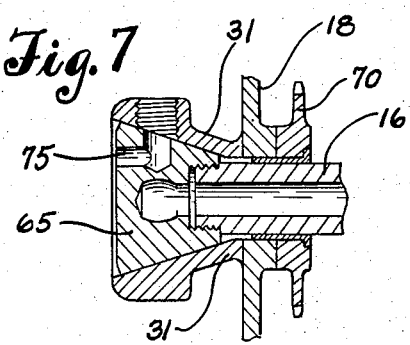

United States Patent Office 3,028,969
Patented Apr. 10, 1962

3,028,969
EXTRACTING MACHINE FOR USE IN
FISH CANNING
Edward M. Borg, 5809½ 20th NW., Seattle, Wash.
Filed Dec. 11, 1959, Ser. No. 859,011
5 Claims. (Cl. 210—330)

This invention relates to a means for treating and canning fish, and other meats that may be subjected to such treatment, for preservation. More particularly, the invention relates to the treatment of certain kinds of fish whereby to effect the removal therefrom of a naturally contained liquid constituent, or content, that otherwise causes the meat, upon being hermetically sealed in cans or containers, to become mushy, rancid and unpalatable for human consumption; the invention being concerned particularly with the treatment of those certain species of fish known in the fishing industry as "gray fish" or "dog fish" which heretofore have been considered unsuitable for canning or preservation for human consumption. The term "fish" as herein used has reference to the edible portion of fish which is ordinarily canned.

The present invention is based upon the knowledge that the extraction from the fish of this particularly undesirable liquid constituent preparatory to sealing it in containers will make preservation possible, and furthermore will render the canned and preserved product quite palatable and desirable for human consumption.

In previous patents, I have disclosed a certain treatment of fish preparatory to canning it to facilitate extraction of the aforementioned undesirable liquid therefrom by a direct application of mechanical pressure after the fish has been placed in the cans. In some of such instances of liquid extraction as effected by mechanical pressure, I have employed suction or vacuum to aid in the removal of the extracted liquid from the cans or containers. However, to my knowledge, liquid extraction from the meat of the fish by applied vacuum and entirely without the application of any mechanical force, has not heretofore been employed in fish canning operations.

It is the principal object of this invention to provide means for treating and canning fish, or any other meat that is subject to this treatment, that is characterized by the application of liquid extracting vacuum to the fish after it has been packed in cans or containers for preparatory treatment and preservation, to effect both the extraction of liquid from the fish and the draining of the extracted liquid from the cans. Furthermore, it is an object of the present invention to effect this extraction and removal of liquid content from the fish in such manner that there will be no tendency to compress, cake or solidify the meat as packed but rather to loosen its tissues and expand it in body.

Still further objects and advantages of the present invention reside in the provision of a novel machine or mechanism whereby the present extraction and draining of the cans may be effectively and expeditiously carried on in a commercially practical manner consistent with present day canning operations.

In accomplishing the above mentioned and other objects of the invention, I have provided a machine with improved details of construction and mode of operation, the preferred forms of which are illustrated in the accompanying drawings, wherein:

FIG. 3 is an enlarged side view of one of the extracting units of the machine, shown partly in longitudinal section, in readiness to receive a can for extraction.

FIG. 4 is a side view of the unit as shown in FIG. 3 with its upper end portion in vertical section.

FIG. 5 is a view of the can discharge means as seen on section line 5—5 in FIG. 1.

FIG. 6 is a side view and partial vertical section, taken on the axial line of the machine's turret.

FIG. 7 is a sectional view of the vacuum control valve taken on line 7—7 in FIG. 5.

FIG. 8 is a sectional view of one of the cam supporting pads and its actuating cam.

Figure 1:
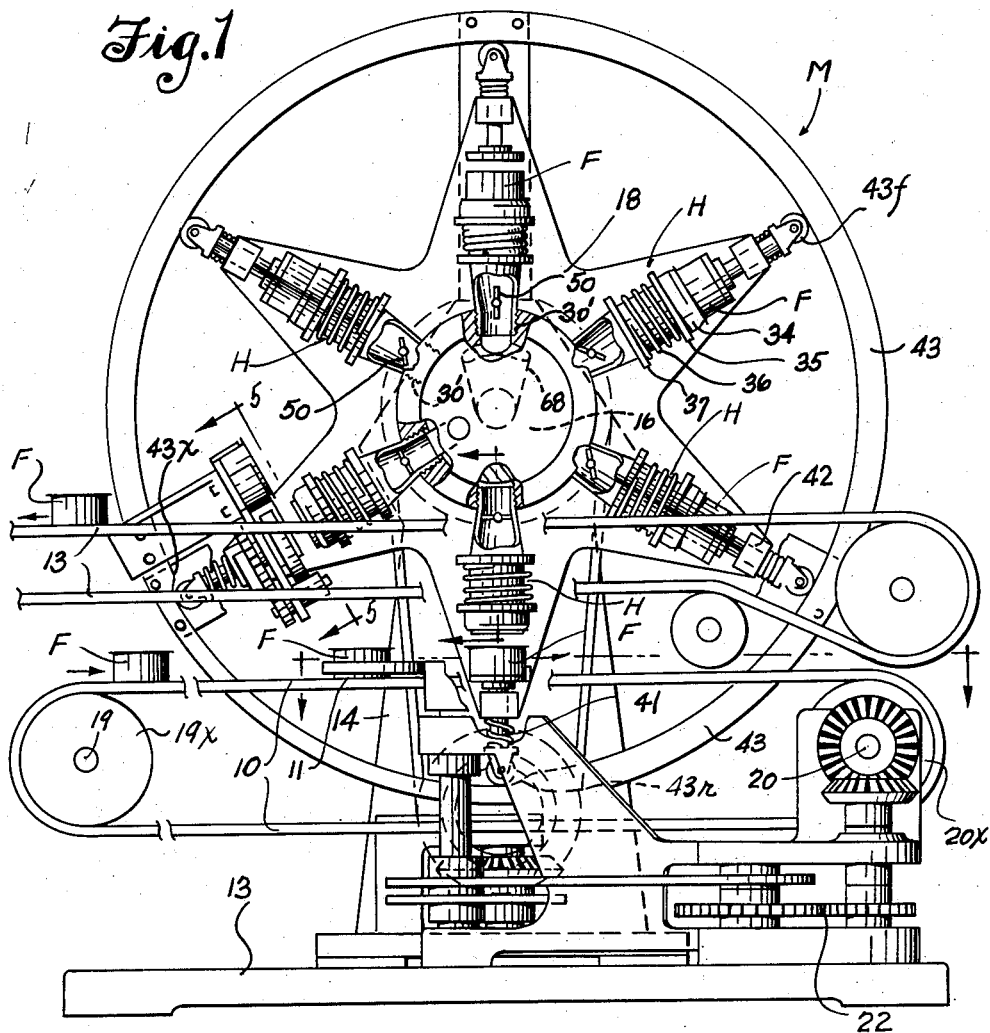
FIG. 1 is a front elevation of an extracting machine embodied by the present invention, showing unclosed cans of fish being moved into the machine for extraction. Also showing the delivery of fish filled cans from the machine after extraction.
Figure 2:
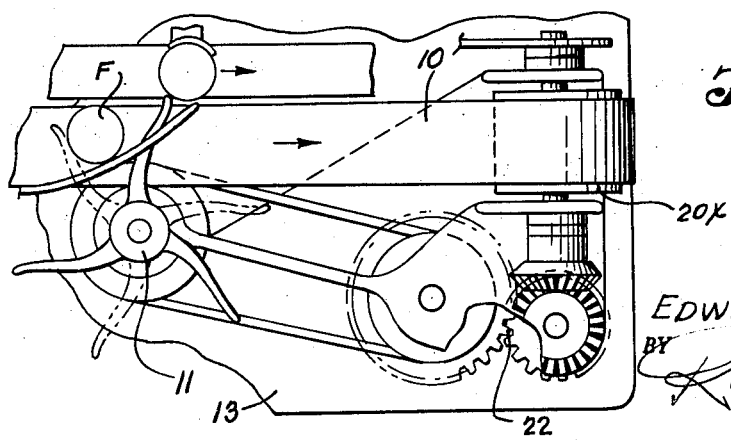
FIG. 2 is a plan view of the devices employed for timing the delivery of cans into the machine for extraction.

Referring more in detail to the drawings:

In the present preferred form of construction, the machine herein designated, in its entirety, by reference character M, is the "vertical turret type" and the fish, after its preparatory treatment, is delivered thereto in unclosed cans of standardized size, in succession, and in proper timing, in a manner and by means much like that of the usual can sealing operation. In the present instance, the cans of fish, F, are delivered to the machine on the horizontal top run of a continuous conveyor belt 10 and are timed in their movement from the belt into the machine by a rotatably driven star wheel 11. Extraction takes place as the cans are moved through the machine. After extraction, they are discharged from the machine to a conveyor 13 and may be moved thereby to a place of storage or if such is desired, to a vacuumizing and sealing machine.

The preparatory treatment which is given the fish before the operation of liquid extraction includes the usual butchering, cleaning and cutting of pieces and properly filling the cans. Then the filled cans, without their top end closures, are subjected to a steam bath for a predetermined period, usually about ten minutes during which they are subjected to heat of about 210° F. to facilitate the subsequent liquid extraction. Immediately after this, the cans of fish are conveyed through a cold water bath, then drained of the bath water and delivered onto the conveyor belt 10 for advancement to the extracting machine which, as will presently be explained, operates to extract the liquid constituent from the fish and as an incident thereto, to effect the removal of this liquid from the fish containers or cans. It will be pointed out here that the liquid to be extracted is sealed in the meat cells and tissues and can not be removed economically or effectively by draining.

In FIG. 1 of the drawings, the extracting machine M is shown to comprise a horizontal base 13 on which an A-frame structure 14 is vertically fixed. At its top, the frame 14 has a suitable bearing 15 in which a horizontal tubular shaft 16 is slidably keyed for limited endwise adjustment. Rotatably mounted on the forward end portion of this shaft is a turret 18 supported in a vertical plane. Supported at opposite sides of the A-frame, by any suitable means supported on the base 13 at a lower horizontal level and parallel to the tubular shaft 16 are shafts 19 and 20, mounting belt wheels 19x and 20x in alignment and about which the conveyor belt 10 operates to deliver the cans of fish F to the machine; their delivery to the turret and to the extracting heads thereon, presently described, being timed by the action of the star wheel 11 which is of typical design and mode of operation.

It is to be observed by reference to FIG. 1, that the extracting heads or units, each designated in its entirety by reference letter H, are of hollow, cylindrical form and are disposed radially of the front face of the turret 18. As each head passes through the lowermost portion of the arc of its travel, the star wheel 11 moves one of the cans of fish F into axial registration therewith, for extraction, as will presently be explained. Each can of fish, as brought into extracting position, then travels with the turret and the extraction head through an arc of about 300° during which extraction and the drainage of extracted liquid takes place. The extracted can is then displaced from the head and is delivered onto the off-bearing conveyor 13.

Operation of the conveyor belt 10 is herein effected by a geared driving connection with shaft 19, shown at 22 in FIG. 1. Likewise, the star wheel 11 and belt 13 may be driven by any satisfactory driving connection to time their movements with that of the turret 18 and the spacing of the extracting heads thereon.

In lieu of the belt 10, for delivery of cans of fish to the machine, the delivery might be accomplished with a turret type or other form of mechanism; the main requirement being that the cans be brought into exact registration successively with the lower ends of the extracting heads H as the turret 18 revolves and then caused to move with the head, for extraction through the extracting arc presently to be described.

Before describing the functional operation of the extracting machine, the details of construction and mode of operation of the individual extracting heads 4 as mounted on the turret 18 will be given; one of these is shown in detail in FIG. 3.

It has been shown in FIG. 1 of the present drawings that the turret 18 is equipped with six equally spaced extracting heads H or units. Each unit is like the others and for that reason the description of one will be given with the understanding that it applies equally to all. For this description references will be directed more particularly to FIGS. 3 and 4.

Each extracting head H comprises a cylindrical or tubular body portion 30 that is fixed relative to the turret, radially thereof, by a supporting hub 31 of conical form that is fixed coaxially to the front face of the turret. The inner end portion of the tubular body 30 is of reduced diameter and threads, in a vacuum sealed joint, into an opening 31' in the forward end portion of the hub 31, as has been best shown in FIG. 6. At its outer end the tubular body 30 is closed, as best shown in FIG. 3, by a flat perforated plate 32 overlaid with a fine mesh screen 33. The diameter of the outer end portion of this tubular body is such as to be snugly received within the open end of a can F upon delivery of the can for extraction, to the machine.

Closely adjacent its outer end, the tubular body 30 has a resilient rubber gasket 34 fitted thereto and this is backed by a metal ring 35 slidably applied about the body 30 to yieldingly resist inward movement of the gasket and this ring 35 is backed by a coil spring 36, which surrounds the body and, at its inner end, seats against a metal ring 37 that is fixed about the body, as seen in FIG. 3. The arrangement of parts provides that the capped outer end of the body 30 will enter the can and the gasket will effect an air sealed connection with the can flange, to provide for extraction of liquid from the fish in the can by vacuum to be applied through the body 30 and end plate 32.

The mode of operation of the machine and turret, as equipped with the plurality of extraction heads H is such that, as the cans of fish F are delivered, in succession, from the conveyor belt 10 by the star wheel 11, each is placed in axial alignment with and immediately below the end of the head H that is then at the lower arc of the turret, upon a pad 40 that is supported by and which moves with the turret as it rotates. It is shown in FIGS. 6 and 8 that each of the pads 40 is mounted by a supporting stem 41 slidable in a guide bearing 42 formed as a part of a bracket 42' that is fixed to the turret. At its outer end each stem is equipped with a cam follower roller 43f that rolls on a cam ring 43 that is supported in a fixed position concentric of the turret axis from the A-frame 14. After the can has been removed from the belt 10 by the star wheel and moved onto the pad 40 that pad is slightly lifted and the open top end of the can caused to receive the outer end of the tubular extraction head H therein and an air tight joint effected with the sealing gasket. This lifting of the pads at this point is caused by a slight rise of the cam ring, shown at 43r in FIG. 1, thus to retain the sealed connection between can flange and head during the travel of the can with the turret 18.

The lifting of the can by the cam rise 43r also slightly lifts the gasket 34 and ring 35 against the resistance afforded by coil spring 36.

It is shown in FIGS. 3 and 4 that the cylindrical body 30 is equipped within its restricted inner end portion with a butterfly valve 50 fixed on a rotatable valve stem 51 that extends through to one side of the body and is there equipped with a wheel 52. A link 53 is pivotally connected eccentrically at its outer end to this wheel as at 55 in FIG. 4, and at its lower end is pivotally attached as at 56 to the ring 35.

This valve operating connection provides that with the lifting of a can pad 40 and can F disposed thereon to effect the sealing of the can against the gasket 34, the valve 50 will be slightly opened to prepare for extraction of liquid from the fish and its removal from the can.

The source of vacuum for the present extraction comprises a closed liquid receptacle and vacuum tank 60 mounted on the base 10, as shown in FIG. 6. Suitable vacuum is maintained within the tank by a vacuum pump 61 connected therewith as at 62. An open pipe connection 63 leads from the top of the tank 60 and is connected with the rear end of the tubular spindle or turret mounting shaft 16. Shaft 16, has seen in FIG. 6, extends forwardly and coaxially through the turret 18 and into the conical hub 31 that is fixed to the turret to rotate therewith. This conical hub constitutes the outer member or housing of a vacuum valve in which a conical plug 65 is fitted, as has been shown in FIG. 6. The plug 65 being threaded onto and fixed against rotation on the tubular shaft 16.

The six extraction heads, H, as threaded at their inner ends into radial openings 30' of the conical housing 31 are adapted, in the rotation of the turret, to successively pass in registration with the outer end of a suction opening 68 formed radially of the plug and which opens at its inner end into the tubular shaft 16 as shown in FIGURE 6 thus to successively cause the extraction heads to be subjected to the vacuum of tank 60 as the turret rotates.

It is shown in FIG. 1 that the opening 68 extends, at its outer end through an arc of about 30°.

Rotation of the turret 18 is effected through a sprocket wheel 70 that is fixed to the back of the turret for rotation coaxially of and about shaft 16, as seen in FIG. 6. Any suitable driving connection with this sprocket wheel may be employed and this connection may also serve as a part of a driving connection for the belts 10 and 13 as seen in FIG. 1.

With the machine so constructed, its use is as follows: Cans of fish F are successively delivered to the machine on the conveyor belt 10 and in proper timing with the rotation of the turret 18 are moved by the star wheel 11 onto the cam lifting pads 40 as they successively pass the can receiving arc.

Immediately after a can F has been disposed on its pad 40, the pad is lifted slightly, thus to lift the open end of the can against the rubber sealing gasket 34 of the corresponding extraction head H. This causes a slight lifting of the corresponding ring 35 and an incident partial opening of the vacuum valve 50 in that head H.

As the turret 18 continues to rotate, the inner ends of the vacuumizing or extraction heads H are caused to pass into registration with the vacuumizing passage 68 of valve plug 65 and vacuum is applied through valve 50 to the can F as applied to the outer end of the head and the full force of the vacuum is applied to the can. This effects the extraction of liquid from the fish and causes the extracted liquid to flow through the valve passage 68 to the tubular shaft 16 and thence through it into the vacuum tank 60. With the full force of vacuum applied, the valve 50 is caused to be fully opened and then the can F thereby pulled away from the pad, as has been shown at the top of FIG. 1 but held against displacement from the head H.

With the passage of the heads H past the vacuumizing passage 68 of plug 65 the cans will be retained on the heads by vacuum pull until they successively arrive at a discharge point at which the vaccum in the suction head carrying the can is fully relieved thus to release the can. This relief of vacuum is effected by the passing of the inner ends of the openings 30' into which the heads are threaded into registration with an atmospheric port 75 formed in the plug 65 of the vacuum valve, as shown in FIG. 7. This results in the instant relief of vacuum and an inward rush of outside air to the head that effects quick release of the can and its displacement outwardly against the pad 40 as the cam roller of the pad drops off of the cam rise, shown at 43x in FIG. 1. As this takes place the released can is engaged by a radial arm 80 shown in FIG. 5 to extend from an actuating shaft 81, to move the can along a guideway 82 and onto the off-bearing belt 13. The shaft 81 has an actuating gear 82' at its lower end and this is in mesh with a gear 83 mounted at the underside of the guideway base plate 82b with a radial arm 80 positioned for actuation by parts that rotate with the turret.

It is to be understood that in the travel of the cans of fish F with the turret, the extraction arc may be extended or decreased as found desirable merely by extending or lessening the arc of the outer end of the passage 68, as formed in the valve plug 65. Also, extraction can be made to take place sooner or later than herein provided for by an adjustment of the valve plug 65. The extraction is effected entirely without mechanical pressure, and since it is applied at the top of the arc of rotation, of each head, the extracted liquid will flow past the open valves 50 and into the tubular shaft 16 into tank 60 from which it may be withdrawn through a faucet 90.

It is further to be noted that the plug 65 of the vacuum valve is automatically maintained in vacuum tight joint with its housing 31 by pressure of a coiled spring 91 that is applied about the shaft 16, under compression, between the bearing 15 and a collar 92 that is rotatably secured on the inner end of the shaft 16 as seen in FIG. 6.

It is further apparent that the driving of the turrets and belt 12 and 13 and synchronizing of the various devices might be accomplished in various ways other than herein shown and it is not the intent that the invention be confined thereto.

An important feature of the present invention resides in the functioning of the coil springs 36 that surround the cylindrical extraction heads H. These springs have the double function of holding the gaskets 34 in tightly sealed joints against the can flanges and also to resist inward movement of the cans that under vacuum pull might operate to compact the fish in the cans as extraction takes place. However, since the springs 36 do counteract vacuum pull, the fish is not subjected to any pressure that would, in any way, act to compress or compact it. The pressure or resistance of these springs is so adjusted that the slight movement of the gaskets for opening the valve 50 is provided for.

The gist of the invention is believed to reside in the means for extraction of the liquid constituent from the fish without mechanical or other pressure that would tend to compact, compress or solidify the meat in the can.

Also to effect the removal of extracted liquid from the cans as the extraction takes place.

The machine leaves the meat fluffier, and of more body after extraction and as an incident to the removal of the liquid, the meat is freed of its normally unpleasant odor, and made quite palatable and desirable for human consumption.

What I claim as new is:

1. A machine of the character described comprising in combination, a turret mounted for rotation about a horizontal, tubular axle, a plurality of hollow extraction heads fixed radially to said turret about its axial center for rotation therewith, an airtight liquid receptacle, means for maintaining vacuum in said receptacle, a vacuum pipe leading from said liquid receptacle to said tubular axle, an extraction valve, common to all extraction heads, comprising a housing fixed coaxially to the turret and rotatable therewith and a valve plug fitted in said housing and fixed against rotation, to said tubular axle, each extraction head having its inner end connected, in a vacuum sealed joint, with an opening in the valve housing, and said plug having a passage connected at one end with the tubular axle and opening at its other end to a side of the plug and with which passage the openings of the valve housing successively are registered as the turret rotates; said extraction heads having openings at their outer ends, a can support movably associated with each extraction head and rotatable with said turret, means for disposing open cans of fish on said supports as the turret rotates, means associated with the supports for lifting them to cause the cans to be lifted to seat their open upper ends against the outer ends of the extraction heads in air sealed connections about the outer end openings thereof as the heads pass through the lower portion of their path of rotative travel; said extension providing connection with the vacuumized liquid receptacle for extraction during travel of the cans across the upper portion of the arc of rotation and drainage of extracted liquid through the extraction valve and tubular axle, to the vacuumized liquid receptacle.

2. The combination recited in claim 1 wherein said extraction valve effects the closing of the vacuumizing connection after extraction and draining of each can and then opens the head to atmospheric pressure, preparatory to the release of each can for its displacement from the extraction head.

3. The combination recited in claim 2 including an off bearing conveyor and means for the disposition of the extracted cans, as released from the heads of the rotating turret, onto said off-bearing conveyor.

4. A machine according to claim 1 including a vacuum regulating valve disposed in each of the extraction heads adjacent its connection with the extraction valve, a joint sealing collar yieldingly applied to each extraction head about its open end and against which the open ends of the cans are seated for extraction, and an operative connection between each joint sealing collar and the corresponding vacuum regulatig valve for causing slight opening of the valve incident to a can being seated against the collar and a full opening of the valve with the full opening of the extraction valve.

5. The machine of claim 4 wherein spring means are applied about the extracting heads to yieldingly resist valve closing movement by the collars under the lifting force of said can supports.

References Cited in the file of this patent
UNITED STATES PATENTS

| 2,176,126 | Everett | Oct. 17, 1939 |
| 2,240,167 | Adams | Apr. 29, 1941 |
| 2,354,308 | Everett | July 25, 1944 |